US009739396B2

(12) United States Patent
Coleman et al.

(10) Patent No.: US 9,739,396 B2
(45) Date of Patent: *Aug. 22, 2017

(54) APPARATUS FOR FLUID CONTROL DEVICE LEAK DETECTION

(71) Applicant: Fisher Controls International LLC, Marshalltown, IA (US)

(72) Inventors: Afton Renee Coleman, Marshalltown, IA (US); Blake Ward Coleman, Marshalltown, IA (US); Steven William Hagen, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 145 days.

This patent is subject to a terminal disclaimer.

(21) Appl. No.: 14/710,376

(22) Filed: May 12, 2015

(65) Prior Publication Data

US 2015/0240968 A1    Aug. 27, 2015

Related U.S. Application Data

(63) Continuation of application No. 13/568,992, filed on Aug. 7, 2012, now Pat. No. 9,255,649.

(51) Int. Cl.
| | |
|---|---|
| *F16K 37/00* | (2006.01) |
| *F17D 5/02* | (2006.01) |
| *G01M 3/28* | (2006.01) |
| *G05B 9/02* | (2006.01) |

(52) U.S. Cl.
CPC ......... *F16K 37/0041* (2013.01); *F16K 37/00* (2013.01); *F16K 37/0083* (2013.01); *F16K 37/0091* (2013.01); *F17D 5/02* (2013.01); *G01M 3/2876* (2013.01); *G05B 9/02* (2013.01); *Y10T 137/0379* (2015.04); *Y10T 137/7836* (2015.04); *Y10T 137/8158* (2015.04)

(58) Field of Classification Search
CPC .. F16K 37/0041; F16K 37/00; F16K 37/0083; F16K 37/0091; F17D 5/02; G01M 3/2876; G05B 9/02
See application file for complete search history.

(56) References Cited

U.S. PATENT DOCUMENTS

| | | | |
|---|---|---|---|
| 3,800,413 A | 4/1974 | Frick | |
| 4,876,530 A | 10/1989 | Hill et al. | |
| 6,128,946 A * | 10/2000 | Leon | F16K 5/0663 73/40.5 A |
| 6,396,583 B1 | 5/2002 | Clare | |

(Continued)

OTHER PUBLICATIONS

United States Patent and Trademark Office, "Non-Final Office Action", issued in connection with U.S. Appl. No. 13/568,992, mailed on Jul. 24, 2015, 11 pages.

(Continued)

*Primary Examiner* — Kevin Lee
(74) *Attorney, Agent, or Firm* — Hanley, Flight & Zimmerman, LLC

(57) ABSTRACT

Apparatus for fluid control device leak detection is disclosed. An example method includes monitoring a value at a purge port of a fluid control device using a sensor, the fluid control device including bellows; comparing the value to a threshold value; and determining, via a processor, that the value is outside of the threshold value, the value being outside of the threshold value indicative of a leak in the bellows.

22 Claims, 3 Drawing Sheets

(56) References Cited

U.S. PATENT DOCUMENTS

| | | | |
|---|---|---|---|
| 7,117,877 | B2 | 10/2006 | Bahr |
| 7,621,293 | B2 | 11/2009 | Snowbarger |
| 7,940,189 | B2 | 5/2011 | Brown |
| 8,831,792 | B2 | 9/2014 | Maier et al. |
| 8,947,242 | B2* | 2/2015 | Kucera ............... F16K 37/0091 137/613 |
| 9,074,770 | B2* | 7/2015 | Young et al. ........... F23N 1/002 |
| 9,255,649 | B2* | 2/2016 | Coleman et al. ........ G05B 9/02 |
| 2001/0054967 | A1 | 12/2001 | Vanderah et al. |
| 2007/0010968 | A1* | 1/2007 | Longsdorf et al. .... G08C 19/02 702/183 |
| 2009/0222220 | A1 | 9/2009 | Wilke |
| 2011/0001070 | A1 | 1/2011 | Wilke |
| 2014/0041738 | A1 | 2/2014 | Coleman et al. |

OTHER PUBLICATIONS

United States Patent and Trademark Office, "Notice of Allowance", issued in connection with U.S. Appl. No. 13/568,992, mailed on Dec. 21, 2015, 10 pages.

Fisher Controls International LLC, "Fisher ENVIRO-SEAL Bellows Seal Bonnets," Product Bulletin, Jun. 2010, 8 pages.

Fisher Controls International LLC, "Fisher FIELDVUE DVC6200 Digital Valve Controller," Instruction Manual, Jun. 2011, 152 pages.

Patent Cooperation Treaty, "Invitation to Pay Additional Fees and, Where Applicable, Protest Fee," issued by the International Searching Authority in connection with PCT Application No. PCT/US2013/053689, mailed on Apr. 7, 2014, 5 pages.

United States Patent and Trademark Office, "Office Action," issued in connection with U.S. Appl. No. 13/568,992, mailed on Apr. 6, 2015, 16 pages.

Patent Cooperation Treaty, "International Search Report," issued by the International Searching Authority in connection with PCT Application No. PCT/US2013/053689, mailed on Dec. 22, 2014, 6 pages.

Patent Cooperation Treaty, "Written Opinion," issued by the International Searching Authority in connection with PCT Application No. PCT/US2013/053689, mailed on Dec. 22, 2014, 11 pages.

Patent Cooperation Treaty, "International Preliminary Report on Patentability," issued by the International Searching Authority in connection with PCT Application No. PCT/US2013/053689, mailed on Feb. 10, 2015, 12 pages.

* cited by examiner

APPARATUS FOR FLUID CONTROL DEVICE LEAK DETECTION

RELATED APPLICATION

This patent arises from a continuation of U.S. patent application Ser. No. 13/568,992 filed Aug. 7, 2012, now U.S. Pat. No. 9,255,649, which is hereby incorporated herein by reference in its entirety.

FIELD OF THE DISCLOSURE

This patent relates generally to leak detection and, more specifically, to apparatus for fluid control device leak detection.

BACKGROUND

Fluid control devices implemented in hazardous and/or lethal applications (e.g., chlorine and/or polysilicon production) may include bellows to prevent process fluid from leaking through a bonnet to the atmosphere. However, in time, these bellows may leak. In some instances, these sensors may be used to detect a bellows leak in a fluid control device.

SUMMARY

An example method includes monitoring a value at a purge port of a fluid control device using a sensor, the fluid control device including bellows; comparing the value to a threshold value; and determining, via a processor, that the value is outside of the threshold value, the value being outside of the threshold value indicative of a leak in the bellows.

An example apparatus includes a fluid control device; an actuator coupled to the fluid control device; and a controller, the controller including: a plurality of ports, a first one of the ports to receive a supply pressure to drive the actuator and a second one of the ports to be fluidly coupled to a bonnet port of the fluid control device; a bellows positioned between a flow aperture of the fluid control device and the bonnet port to substantially prevent process fluid from flowing to the bonnet port; a sensor to measure a value at the bonnet port; and a processor to compare the value to a threshold value or a previously measured value to determine if there is a leak in the bellows.

An example apparatus includes a plurality of ports, one of the ports to receive a supply pressure to drive an actuator and another of the ports to be fluidly coupled to a purge port of a fluid control device; a sensor to measure a value at the purge port; and a processor to determine if there is a leak in the fluid control device in response to the measured value being outside a threshold value.

DETAILED DESCRIPTION

Figure 1:
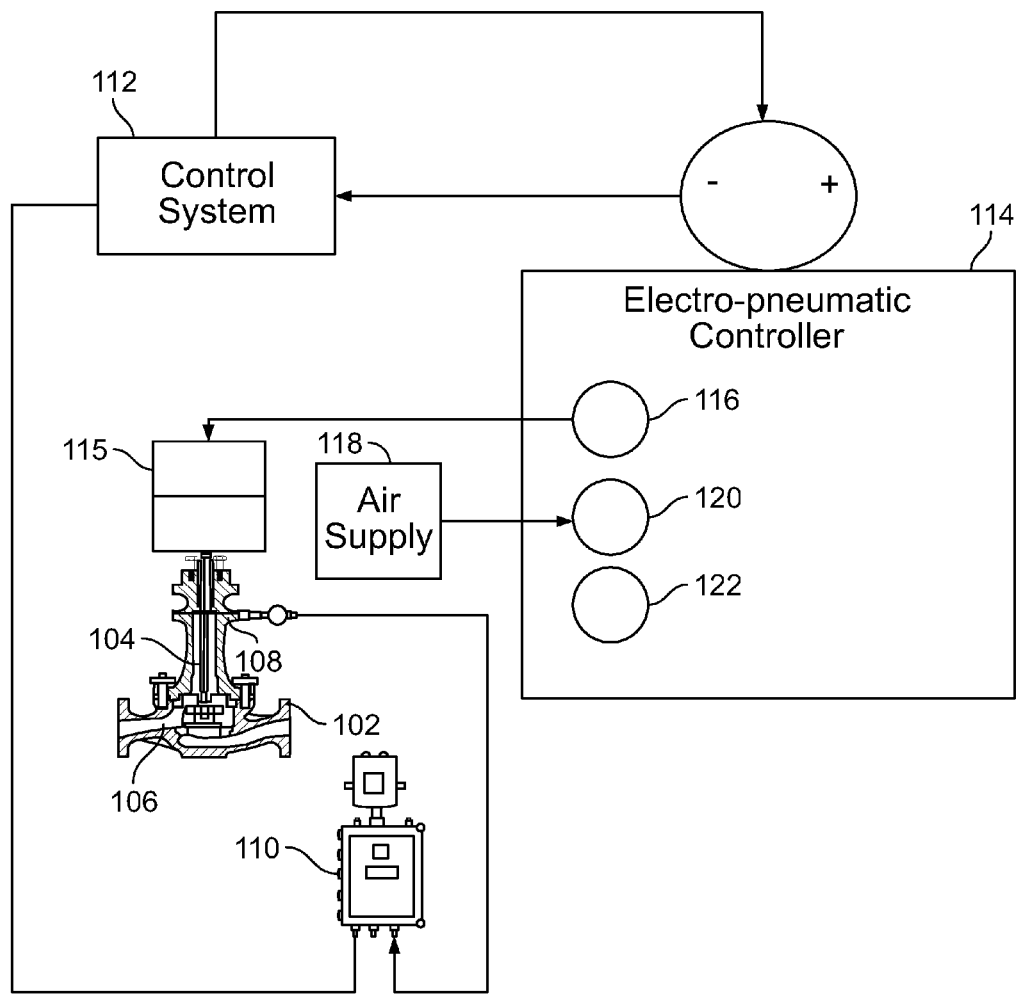
FIG. 1 depicts a known fluid control device.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

Fluid control devices implemented in hazardous and/or lethal applications (e.g., chlorine and/or polysilicon production) may include bellows to prevent process fluid from leaking through a bonnet to the atmosphere. However, in time, these bellows may leak. Detecting such bellows leaks may be difficult without installing additional air monitoring components and/or exposing operators to hazardous conditions.

In some examples, bellows leaks may be detected at or around a valve using air monitoring equipment, pressure gauges and/or transmitters (e.g., air monitoring components). The air monitoring components may be coupled to a purge port of a valve bonnet being monitored. In operation, air quality and/or pressure measurements are transmitted to a control system that analyzes the measured values. The control system is remote from the air monitoring components. Based on the analysis, the control system may alert an operator of a potential bellows leak. While effective in monitoring bellows leaks, the logic of such systems is remote from the air monitoring components.

The examples disclosed herein monitor for bellows leaks and automatically alert and/or provide early detection and/or remote notification of such leaks using a controller, an electro-pneumatic controller and/or a digital valve controller (DVC). Such an approach eliminates the need for the additional air monitoring components while also enhancing plant safety by not exposing operators to the environment around the valve (e.g., the valve site) being monitored.

In some examples, to monitor a valve for bellows leaks, a purge port of a bonnet is coupled to a pressure sensing port of a DVC having integral pressure sensing capabilities. In examples in which the valve is a single-acting valve, the pressure sensing port may be an unused port of the DVC that is configured to measure the purge port pressure. In examples in which the valve is a double-acting valve, the pressure sensing port may be a port of the DVC dedicated to measuring the purge port pressure and, thus, detecting bellows leaks. Regardless of the type of valve being monitored, the examples disclosed herein monitor bellows leaks by identifying pressure changes at a purge port. If the DVC determines that the pressure changes a particular amount, the DVC notifies an operator by conveying an alert to a control system and/or monitoring software. Additionally, the DVC may generate and/or provide data to generate a report including the date, the time, etc. of the bellows leak.

In some examples, to enable the DVC to detect a pressure change, a profile is created using diagnostic capabilities of the DVC that enables performance diagnostics of the DVC to monitor the valve (e.g., monitor the health of the valve). In some examples, the profile is configured and/or setup using monitoring software. The profile may specify a minimum bellows pressure change prior to sending an alert. However, in other examples, firmware used to implement the disclosed examples may include a bellows leak alert. In some such examples, a profile for the pressure change is not created (e.g., not set up by an operator). In any of the examples disclosed, the monitoring software may be AMS software and/or ValveLink Solo software of Emerson Process Management. While the above example describes measuring pressure to identify a bellows leak, other parameters such as air quality may additionally or alternatively be measured and used to identify a leak.

In applications where the process pressure is over approximately 150 pounds per square inch (psi), a pressure regulator may be installed between the purge port and the DVC to substantially prevent the process pressure from damaging the DVC. In some examples, to protect the DVC from process fluid, a pressure sensing diaphragm separates the process fluid from the DVC. The pressure sensing diaphragm may be integral to the DVC and/or external to the DVC.

FIG. 1 depicts a known fluid control device and/or valve 102 that includes bellows 104 to substantially prevent process fluid from flowing to the atmosphere. The bellows 104 is positioned between a flow path 106 and a purge port 108 of the fluid control device 102. However, in time, the bellows 104 may leak.

In operation, to monitor for bellows leaks, a sensor 110 measures a value at the purge port 108. The value is used by a control system 112 remote from the sensor 110 to determine if the bellows 104 is leaking. In examples in which the measured value is an air quality value, the control system 112 may determine that the bellows 104 is leaking if the measured air quality value has changed and/or is outside of an acceptable and/or predetermined air quality value. In examples in which the measured value is a pressure value, the control system 112 may determine that the bellows 104 is leaking if the measured pressure value is higher than a predetermined pressure and/or if the pressure has risen a particular amount. In examples in which the sensor 110 is not coupled to the control system 112, the fluid control device 102 may be monitored for bellows leaks by an operator walking to the valve site and observing the sensor 110.

To control the position of the fluid control device 102, an electro-pneumatic controller 114 is coupled to an actuator 115 via a first port 116 and coupled to an air supply 118 via a second port 120. In examples in which the actuator 115 is a double-acting actuator, the controller 114 is also coupled to the actuator 115 via a third port 122. However, in examples in which the actuator 115 is a single-acting actuator, as illustrated in FIG. 1, the third port 122 is unused. In operation, the controller 114 measures the position of the actuator 115 and, based on commands received from the remote control system 112, causes the actuator 115 to move to a particular position.

Figure 2:
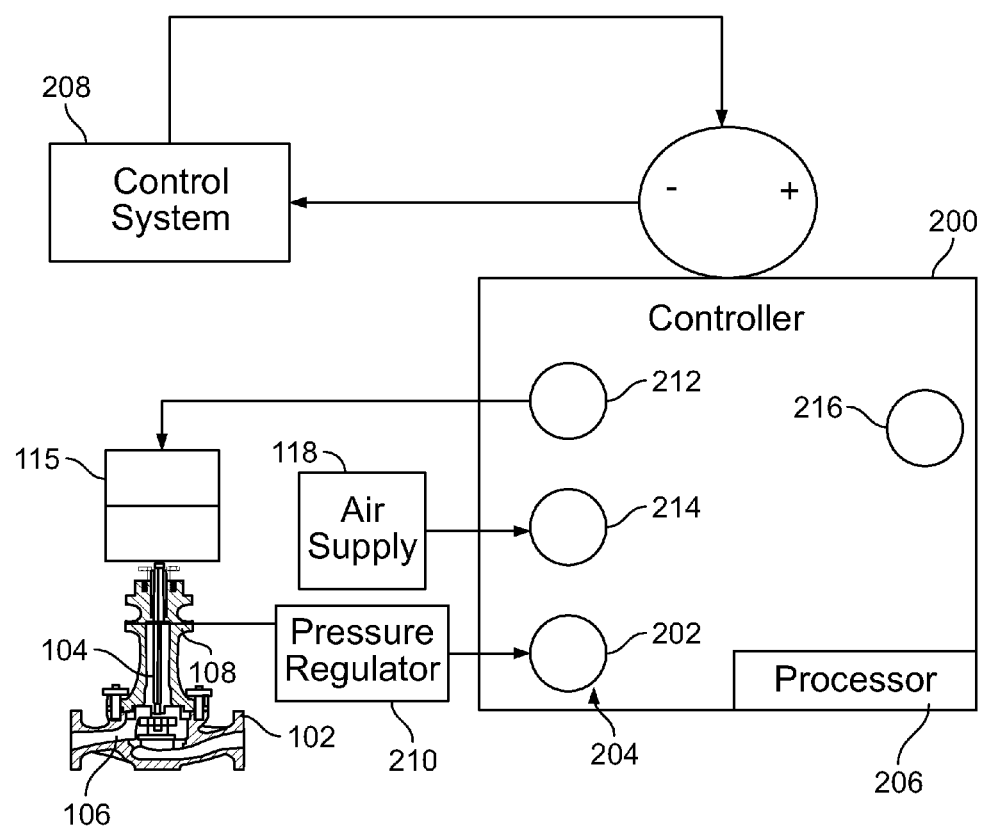
FIG. 2 depicts a fluid control device and an example controller in accordance with the teachings of this disclosure.

FIG. 2 depicts an example controller 200 with integrated bellows leak detection capabilities in accordance with the teachings of this disclosure. In operation, to monitor for bellows leaks, a first and/or air monitoring port 202 of the controller 200 is coupled to the purge port 108 to enable a sensor 204 of the controller 200 to measure a value at the purge port 108. The measured value is used by a processor 206 of the controller 200 to determine if the bellows 104 is leaking. Thus, in contrast to known examples that use remote processing capabilities of the control system 112 (FIG. 1) and require additional external monitoring equipment, the controller 200 determines if the bellows 104 is leaking at the valve site (i.e., a local determination).

The sensor 204 may be a pressure sensor, an air quality sensor, etc. In examples in which the sensor 204 is an air quality sensor, the processor 206 may determine that the bellows 104 is leaking if the measured air quality value has changed and/or is outside of an acceptable and/or predetermined air quality value. In examples in which the sensor 204 is a pressure sensor, the control system 112 may determine that the bellows 104 is leaking if the measured pressure value is higher than a predetermined, threshold and/or fixed pressure and/or if the pressure has risen a particular amount over a particular amount of time, for example.

If the processor 206 determines that the bellows 104 is leaking, the processor 206 may automatically alert and/or notify a control system and/or monitoring system 208 and/or an operator associated therewith. Such early notification of a bellows leak enhances operator safety because the fluid control device 102 may be used to control the flow of hazardous fluids and/or materials. Additionally or alternatively, the processor 206 may generate and/or provide data to generate a report associated with a detected bellows leak. In some such examples, the report may include a time stamp (e.g., date, time, etc.).

To substantially prevent excessive process pressure and/or process fluid from damaging the sensor 204 and/or the controller 200, a pressure regulator 210 and/or a pressure sensing diaphragm may be fluidly coupled between the purge port 108 and the sensor 204.

To control the position of the fluid control device 102, the controller 200 is coupled to the actuator 115 via a second port 212 and coupled to the air supply 118 via a third port 214. In examples in which the actuator 115 is a double-acting actuator, the controller 200 is also coupled to the actuator 115 via a fourth port 216. While the controller 200 includes the fourth port 216, in other examples, the controller 200 may not include the fourth port 216. In operation, the controller 200 measures the position of the actuator 115 and, based on commands received from the control system 208, causes the actuator 115 to move to a particular position.

Figure 3:
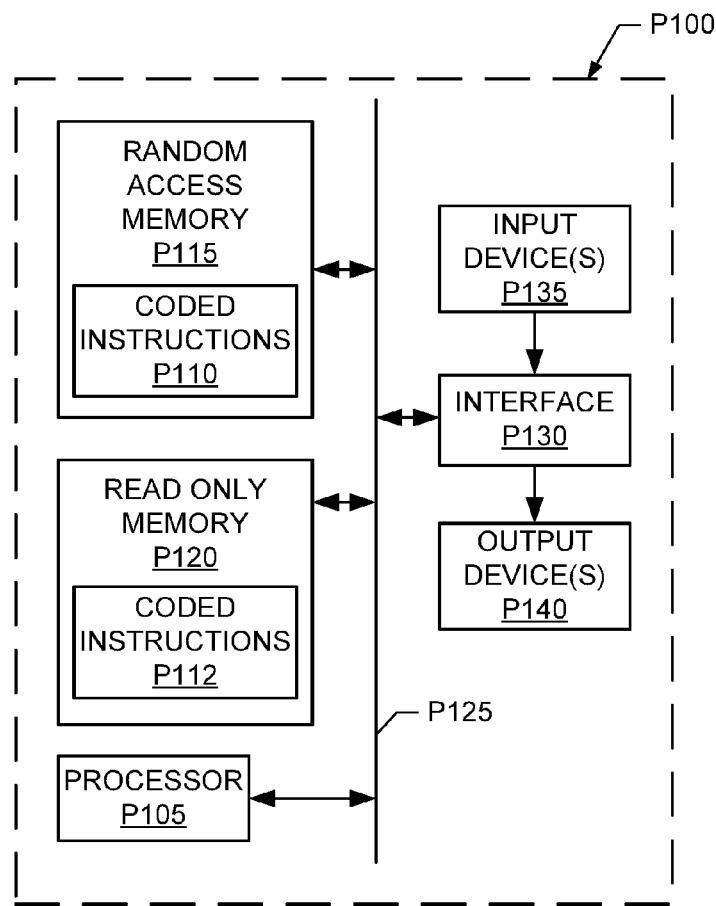
FIG. 3 is a schematic illustration of an example processor platform that may be used and/or programmed to implement any or all of the example methods are apparatus disclosed herein.

FIG. 3 is a schematic diagram of an example processor platform P100 that may be used and/or programmed to implement the controller 200 and/or any of the other examples disclosed herein. For example, the processor platform P100 can be implemented by one or more general purpose processors, processor cores, microcontrollers, etc.

The processor platform P100 of the example of FIG. 3 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

As set forth herein, example apparatus includes a plurality of ports, one of the ports to receive a supply pressure to drive an actuator and another of the ports to be fluidly coupled to a purge port of a fluid control device; a sensor to measure a value at the purge port; and a processor to compare the value to a predetermined value or a previously measured value to identify if the value is outside of a predetermined threshold.

In some examples, the value is outside of the predetermined threshold is associated with a bellows leak in the fluid control device. In some examples, the processor is to generate an alert if the value is outside of the predetermined threshold. In some examples, the processor is to automatically communicate an alert to a remote monitoring system based on the processor identifying that the value is outside of the predetermined threshold. In some examples, the processor is to generate a report if the value is outside of the predetermined threshold. In some examples, the report includes a time stamp. In some examples, the apparatus includes a pressure regulator fluidly coupled between the purge port and the sensor. In some examples, the sensor includes a pressure sensing diaphragm assembly. In some examples, the value includes a pressure value.

An example apparatus includes a plurality of ports, a first one of the ports to receive a supply pressure to drive an actuator and a second one of the ports to be fluidly coupled to a bonnet port of a fluid control device; a bellows positioned between a flow aperture of the fluid control device and the bonnet port to substantially prevent process fluid from flowing to the bonnet port; a sensor to measure a pressure value at the bonnet port; and a processor to compare the pressure value to a predetermined pressure value or a previously measured pressure value to determine if there is a leak in the bellows.

In some examples, the processor is to generate an alert if the processor determines that if there is a leak in the bellows. In some examples, the processor is to automatically communicate an alert to a remote monitoring system based on the processor determining that there is a leak in the bellows. In some examples, the processor is to generate a report based on the processor determining that there is a leak in the bellows.

An example apparatus includes a plurality of ports, one of the ports to receive a supply pressure to drive an actuator and another of the ports to be fluidly coupled to a purge port of a fluid control device, a bellows positioned between a flow aperture of the fluid control device and the purge port to substantially prevent process fluid from flowing to the purge port; and means for detecting a bellows leak in the fluid control device. In some examples, the means for detecting a leak includes a sensor to measure a value at the purge port. In some examples, the means for detecting a leak includes a processor to compare the value to a predetermined value or a previously measured value to determine if there is a leak.

An example apparatus includes a plurality of ports, one of the ports to receive a supply pressure to drive an actuator and another of the ports to be fluidly coupled to a purge port of a fluid control device; a sensor to measure a value at the purge port; and a processor to determine if there is a leak in the fluid control device based on the measured value. In some examples, the leak in the fluid control device is associated with the measured value being outside of a predetermined threshold. In some examples, the processor is to compare the measured pressure value to the predetermined threshold. In some examples, the measured value is a pressure value.

Although certain example methods, apparatus and articles of manufacture have been disclosed herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
   monitoring a value at a purge port of a fluid control device using a sensor, the fluid control device including a bellows;
   comparing the value to a threshold value; and
   determining, via a processor, that the value is outside of the threshold value, the value being outside of the threshold value indicative of a leak in the bellows.

2. The method of claim 1, further including generating an alert in response to the value being outside of the threshold value.

3. The method of claim 2, further including conveying the alert to a remote monitoring system.

4. The method of claim 1, further including generating a report in response to the value being outside of the threshold value.

5. The method of claim 1, further including reducing a pressure between the purge port and the sensor.

6. The method of claim 5, wherein reducing the pressure between the purge port and the sensor includes reducing the pressure using a pressure regulator.

7. The method of claim 1, wherein the value is a pressure value and the threshold value is a threshold pressure value.

8. The method of claim 1, wherein the value is an air quality value and the threshold value is a threshold air quality value.

9. An apparatus, comprising:
   a fluid control device;
   an actuator coupled to the fluid control device; and
   a controller, the controller including:
     a plurality of ports, a first one of the ports to receive a supply pressure to drive the actuator and a second one of the ports to be fluidly coupled to a bonnet port of the fluid control device;
     a bellows positioned between a flow aperture of the fluid control device and the bonnet port to substantially prevent process fluid from flowing to the bonnet port;
     a sensor to measure a value at the bonnet port; and
     a processor to compare the value to a threshold value or a previously measured value to determine if there is a leak in the bellows.

10. The apparatus of claim 9, wherein the controller is a digital valve controller.

11. The apparatus of claim 9, wherein the processor is to generate an alert if the processor determines that there is a leak in the bellows.

12. The apparatus of claim 9, wherein the processor is to automatically communicate an alert to a remote monitoring system based on the processor determining that there is a leak in the bellows.

13. The apparatus of claim 9, wherein the processor is to generate a report based on the processor determining that there is a leak in the bellows.

14. An apparatus, comprising:
   a plurality of ports, one of the ports to receive a supply pressure to drive an actuator and another of the ports to be fluidly coupled to a purge port of a fluid control device, a bellows positioned between a flow aperture of the fluid control device and the purge port to substantially prevent process fluid from flowing to the purge port; and
   means for detecting a bellows leak in the fluid control device.

15. The apparatus of claim 14, wherein the means for detecting a bellows leak comprises a sensor to measure a value at the purge port.

16. The apparatus of claim 15, wherein the means for detecting a bellows leak comprises a processor to compare the value to a threshold value or a previously measured value to determine if there is a leak.

17. The apparatus of claim 14, further comprising means of controlling a pressure at the means for detecting a bellows leak.

18. An apparatus, comprising:
a plurality of ports, one of the ports to receive a supply pressure to drive an actuator and another of the ports to be fluidly coupled to a purge port of a fluid control device;
a sensor to measure a value at the purge port; and
a processor to determine if there is a leak in the fluid control device in response to the measured value being outside a threshold value.

19. The apparatus of claim 18, wherein the leak in the fluid control device is associated with the measured value being outside of a threshold value.

20. The apparatus of claim 18, wherein the processor is to compare the measured value to the threshold value.

21. The apparatus of claim 20, wherein the measured value comprises a pressure value.

22. The apparatus of claim 20, wherein the value being outside of the threshold value is indicative of fluid passing through a leaking bellows.

* * * * *